United States Patent Office 3,836,634
Patented Sept. 17, 1974

3,836,634
PRODUCTION OF NICKEL FLUORIDE
Jerome Saldick, Princeton, N.J., assignor to FMC Corporation, New York, N.Y.
No Drawing. Continuation of application Ser. No. 798,130, Feb. 10, 1969, now Patent No. 3,607,013, dated Sept. 21, 1971. This application Mar. 5, 1971, Ser. No. 121,554
Int. Cl. C01g 53/08
U.S. Cl. 423—489                                       1 Claim

ABSTRACT OF THE DISCLOSURE

A highly active, anhydrous nickel fluoride which is resistant to pick-up of atmospheric water and is superior as a battery element in high energy lithium-nickel fluoride batteries, is produced by passing anhydrous gaseous hydrogen fluoride over amorphous basic nickel carbonate at a temperature of between 150°–300° C. and preferably 225°–250° C.

CROSS-REFERENCES TO RELATED APPLICATIONS

This application is a continuation of my copending application entitled "Production of Nickel Fluoride," Ser. No. 798,130, filed Feb. 10, 1969, and issued on Sept. 21, 1971 as U.S. Pat. No. 3,607,013.

BACKGROUND OF THE INVENTION

A. Field of the Invention

The invention relates to the production of nickel fluoride and more specifically to production of an anhydrous nickel fluoride which is superior as a battery element in high energy lithium-nickel fluoride batteries.

B. Description of the Prior Art

The recent growth of interest in automobiles powered by electric batteries has intensified research in high energy rechargeable batteries. Among the most promising of these high energy rechargeable batteries is a lithium-nickel fluoride system. This battery provides a lightweight, quickly rechargeable, high energy cell which shows real promise as a power source for use in applications ranging from aerospace to lawn mowers, outboard motors, power tools and the like.

In this system, anhydrous nickel fluoride forms the cathode, lithium metal is the anode and the electrolyte is a salt such as potassium hexafluorophosphate dissolved in an organic solution such as propylene carbonate. Anhydrous nickel fluoride has been prepared by the action of liquid hydrogen fluoride and nickel carbonate. When it is prepared from these reactants at low temperatures (e.g., −25° to 12° C.), the nickel fluoride is very hygroscopic as evidenced by its turning green (hydrating) upon exposure to atmospheric moisture and therefore cannot be used as a battery element without prior washing with liquid hydrogen fluoride. When gaseous hydrogen fluoride is made to react with nickel oxide at high temperatures (e.g., on the order of 1000° C.), serious operational problems, including excessive corrosion of equipment and hazard, are encountered. Neither of these methods are satisfactory and accordingly the anhydrous nickel fluorides which are presently available are very expensive.

Another difficulty has been encountered with nickel fluorides, which have been employed heretofore in lithium-nickel fluoride batteries. With such prior nickel fluorides, it has been necessary to run the cell of the battery produced therefrom through repeated discharge-charge cycles in order to render it fully operational. Use of such a discharge-charge cycle procedure has several disadvantages. Firstly, it requires a capital investment in costly electrical controls and equipment, as well as, skilled workmen for its operation. Secondly, the procedure is time consuming and hence a production bottleneck. Thirdly, the procedure is not reliable. In some cases even repeated discharge-charge cycles have not improved the efficiency of the cell.

It therefore has remained desirable to provide an economically satisfactory method for the preparation of a moisture resistant anhydrous nickel fluoride, which would be superior to nickel fluorides normally produced as a battery element in lithium-nickel fluoride batteries, and which will function in batteries without application of a discharge-charge pretreatment.

SUMMARY OF THE INVENTION

I have now found that by reacting amorphous basic nickel carbonate with anhydrous gaseous hydrogen fluoride at a temperature between 150°–300° C. and preferably between 225–250° C., a highly active, anhydrous, nickel fluoride which surprisingly is quite resistant to pick-up of atmospheric water, is produced. This nickel fluoride has a surface area greater than 40 m.$^2$/g. and a crystallite size of about 25 to 60 A. as determined by X-ray diffraction. This product may be used without further treatment as a very effective battery element in high energy lithium-nickel fluoride cells and is produced by my method at relatively low cost.

DESCRIPTION OF THE INVENTION AND PREFERRED EMBODIMENTS

In carrying out the present process, finely divided and amorphous nickel carbonate preferably is placed in a copper tube and heated by an electrical resistance heating means to a temperature of between 150°–300° C., and preferably of 225°–250° C. An anhydrous gaseous mixture of hydrogen fluoride and nitrogen in a 2 to 1 volume ratio at room temperature and pressure is then passed over or through this bed of nickel carbonate. For best efficiency at least an excess of hydrogen fluoride should be used. The reaction goes to completion in accordance with the following equation:

$$NiCO_3 + 2HF \rightarrow NiF_2 + CO_2\uparrow + H_2O\uparrow$$

The carbon dioxide and water by-products are swept away by the gas flow. The rate of flow of the gases should be sufficient to remove the carbon dioxide and water vapor as they are formed. The temperature of the reaction is critical and must be carried out between 150°–300° C. and preferably between 225°–250° C. The temperature must be high enough so that the carbon dioxide and water are efficiently removed but not so high as to promote crystal growth of the nickel fluoride.

The basic nickel carbonate useful in this invention is amorphous and has an Ni/CO$_3$ ratio of greater than 1 (usually about 1.3 with hydroxyl being the other anion). The use of copper apparatus is believed to avoid iron impurities which must be minimized when nickel fluoride is used for battery applications. The following example is given to illustrate the invention but it is not intended to limit the scope thereof in any way.

EXAMPLE 1

Forty grams of basic nickelous carbonate (Analytical Reagent Grade) in finely powdered form was placed in a 2 ft. long copper tube (1″ O.D. $\frac{1}{16}$″ wall) maintained at 250° C. (as indicated by an iron-constantin thermocouple brazed to the wall of the reactor tube 8″ from the bottom). The reactor tube was heated with an insulated nichrome wire heating element and covered with asbestos to maintain temperature uniformity along its length. A flow of 100 cc. per minute (measured at room temperature and pressure) of anhydrous, prepurified nitrogen and 200 cc. per minute of anhydrous hydrogen fluoride gas (evaporated from a cylinder of c.p. hydrogen fluoride) was passed upwards through the reaction tube for two hours. The hot gases leaving the top of the reactor were cooled in a downward-sloping air-cooled ¼" O.D. copper tube, 3 feet long. Liquid water and gaseous carbon dioxide emerged from this tube. After about 2 hours, evolution of fumes indicated that hydrogen fluoride was also coming out of the reactor. The reaction was continued for another 30 minutes. The flow of hydrogen fluoride feed was stopped and the reactor was cooled to room temperature in flowing nitrogen. A substantially quantitative conversion of nickel carbonate to anhydrous nickel fluoride was obtained. The yellow product was non-hygroscopic in ordinary laboratory air, did not turn green when wet with liquid water, and was substantially insoluble in water, dilute sulfuric acid, and aqueous ammonia. Quantitative analysis showed 58.6% nickel, and 40.3% fluorine. It underwent a 0.44% weight loss when heated for 60 minutes at 115° C. Theory is 60.7% nickel and 39.4% fluorine. The X-ray diffraction pattern was in agreement with the known pattern for tetragonal nickel fluoride, assuming a unit cell with $a=4.70$ A. and $c=3.08$ A. The crystallite size of the product was 35 A., and the surface area was 110 m.$^2$/g. Particle size was measured according to the proedure of Klug, H. and L. Alexander, *X-Ray Diffraction Procedures*, John Wiley and Sons, New York, 1954, pp. 491–538. Surface area was determined according to the Continuous Flow Method of Nelsen, F. M. and F. T. Eggertsen, *Analytical Chemistry*, volume 30, p. 1387 (1958) using the Perkin-Elmer Model 212–D Sorptometer.

This product was used in the manufacture of a nickel fluoride electrode which when used in a high energy lithium-nickel fluoride cell gave immediate high capacity results without the necessity of a preliminary discharge-charge cycle.

EXAMPLE 2

Example 1 was repeated except the reactor tube was heated to 175° C. The product had crystallite size of 32 A. and a surface area of 101 m.$^2$/g. This product also gave high capacity results when used as a battery element in a lithium-nickel fluoride battery.

EXAMPLE 3

The procedure of Example 1 was repeated except that the reactor tube was heated to 300° C. The resulting product had a crystallite size greater than 100 A. and a surface area of 47 m.$^2$/g. The product gave high capacity results when used as a battery element in a lithium-nickel fluoride battery; however, this product, while highly useful, was not quite as efficient as the products of Examples 1 and 2.

COMPARATIVE EXAMPLE

Example 1 was repeated except the reactor tube temperature was maintained at 390° C. The product had a crystallite size greater than 300 A. and a surface area of around 10 m.$^2$/g. When used as an element in a lithium-nickel fluoride battery without repeated preliminary discharge-charge cycles, the product gave poor results.

Pursuant to the requirements of the patent statutes, the principle of this invention has been explained and exemplified in a manner so that it can be readily practiced by those skilled in the art, such exemplification including what is to be considered to represent the best embodiment of the invention. However it should be clearly understood that, within the scope of the appended claim, the invention may be practiced by those skilled in the art, and having the benefit of this disclosure otherwise than as specifically described and exemplified herein.

What I claim is:

1. A yellow anhydrous nickel fluoride having the formula NiF$_2$, a surface area greater than 40 m.$^2$/g. and a crystallite size between 25 and about 60 A. as determined by X-ray diffraction, and which is nonhygroscopic, does not turn green when wet with liquid water, and is substantially insoluble in water, dilute sulfuric acid and aqueous ammonia, said nickel fluoride having use as a battery element in lithium-nickel fluoride batteries.

References Cited

UNITED STATES PATENTS 3,607,013   9/1971   Saldick _____ 23—88

OTHER REFERENCES

"The Chemistry of Fluorine and Its Inorganic Compounds," by I. G. Ryss, p. 657 of AEC–tr–3927, part 2.

"Fluorine Chemistry," by J. H. Simons, 1950 ed., vol. I, p. 68, Academic Press Inc., New York, N.Y.

"Treatise on Inorganic Chemistry," by H. Remy, 1956 ed., vol. II, p. 314, Elsevier Pub. Co., New York, N.Y.

Chemical Abstracts, vol. 72, 1970, p. 484.

EDWARD STERN, Primary Examiner

U.S. Cl. X.R.

136—28